United States Patent [19]
Goto et al.

[11] Patent Number: 5,999,685
[45] Date of Patent: Dec. 7, 1999

[54] LIGHT GUIDE PLATE AND SURFACE LIGHT SOURCE USING THE LIGHT GUIDE PLATE

[75] Inventors: Youichiro Goto, Hashima; Michiaki Sato, Ichinomiya; Yasuko Teragaki; Katsutoshi Hibino, both of Gifu; Kenji Torazawa, Ogaki; Masahiro Higuchi; Takanari Kusafuka, both of Gifu, all of Japan

[73] Assignee: Sanyo Electric Co., Ltd., Osaka, Japan

[21] Appl. No.: 08/921,606

[22] Filed: Sep. 2, 1997

[30] Foreign Application Priority Data

| Feb. 7, 1997 | [JP] | Japan | 9-025652 |
| Apr. 16, 1997 | [JP] | Japan | 9-099122 |
| Jun. 9, 1997 | [JP] | Japan | 9-151180 |

[51] Int. Cl.$^6$ .................................................. F21V 8/00
[52] U.S. Cl. ........................... 385/146; 385/901; 362/31; 349/65
[58] Field of Search ................................. 385/146, 901, 385/36, 37; 359/575; 362/31; 349/64, 65

[56] References Cited

U.S. PATENT DOCUMENTS

| 1,707,965 | 4/1929 | Scantlebury | 40/546 |
| 2,347,665 | 5/1944 | Christensen et al. | 40/363 |
| 3,328,570 | 6/1967 | Balchunas | 362/31 |
| 5,408,344 | 4/1995 | Takaguchi et al. | 349/57 |
| 5,420,761 | 5/1995 | DuNah et al. | 362/31 |
| 5,575,549 | 11/1996 | Ishikawa et al. | 362/31 |
| 5,600,455 | 2/1997 | Ishikawa et al. | 349/57 |
| 5,735,590 | 4/1998 | Kashima et al. | 362/31 |
| 5,854,872 | 12/1998 | Tai | 385/133 |

OTHER PUBLICATIONS

Abstract of Japanese Patent Publ. No. 7120752, dated May 12, 1995.

*Primary Examiner*—John D. Lee
*Assistant Examiner*—Michael J. Stahl
*Attorney, Agent, or Firm*—Nikaido, Marmelstein, Murray & Oram LLP

[57] ABSTRACT

A light guide plate is provided including a first lens portion comprising a plurality of recessed or projected lenticular unit lenses formed of the same resin as that of the light guide plate on a light emission surface. The plurality of lenticular unit lenses in the first lens portion are triangular prism portions whose respective vertexes have an angle of 125° to 165° and are so arranged that their respective ridge lines are nearly parallel to each other. Such construction makes it possible to set the number of lenticular lens sheets used to one or to further eliminate the necessity of the lenticular lens sheets, so that the cost of parts and the fabrication cost of the light guide plate can be reduced. A second lens portion may be provided on a light reflective surface opposite to the light emission surface on which the first lens portion is disposed, the second lens portion including a plurality of recessed or projected lenticular unit lenses formed of the same resin as that of the light guide plate. Alternatively, a light guide plate is provided having a plurality of grooves with approximately equal groove widths formed on a surface opposite to a light emission surface, the grooves being arranged substantially parallel to each other and the spacing between the grooves narrowing as the distance from the light incident surface increases, with the spacing from the far end of one of the plurality of grooves proximate to the light incident surface to the near end of a groove adjacent thereto farther away from the light incident surface being 5 to 15 times the groove width.

20 Claims, 11 Drawing Sheets

LIGHT GUIDE PLATE AND SURFACE LIGHT SOURCE USING THE LIGHT GUIDE PLATE

BACKGROUND OF THE INVENTION

1. Field of the Invention

The present invention relates to a light guide plate and a surface light source using the light guide plate, and more particularly, to a surface light source used for a back light of a liquid crystal display or the like, a lighting advertisement, a traffic-control sign, etc., and a light guide plate provided for the surface light source.

2. Description of the Prior Art

Examples of a surface light source for a back light of a liquid crystal display (LCD) include one of a side light type having a transparent flat plate as a light guide plate. In such a surface light source, light is incident from one of the side end surfaces of a light guide plate composed of a transparent parallel flat plate or a flat plate having a wedge shape in cross section, the light is propagated throughout the whole area of the light guide plate utilizing total reflection inside the transparent flat plate, a part of the propagated light is changed into diffused reflected light at less than a critical angle by a light scattering reflective plate on the reverse surface of the light guide plate, and diffused light is emitted from the surface of the light guide plate (see Japanese Utility Model Laid-Open No. 162201/1980, for example).

Furthermore, examples of a surface light source for a back light include one so adapted that a lens sheet having a projection of a triangular prism-type lenticular lens on its one surface, the other surface of which is smooth, is superimposed on the surface of a light guide plate provided for the above-mentioned surface light source with the surface of the projection directed upward, to diffuse its diffused emitted light uniformly and isotropically in a desired angular range utilizing a light focusing function of the lens (see, Japanese Utility Model Laid-Open No. 107201/1992, for example).

When the lens sheet is used in combination with a mat transparent diffusing plate (a mat transparent sheet), light energy of a light source is more intensively distributed in a desired restricted angular range, and diffused light higher in uniformity and isotropy can be obtained in the angular range, as compared with a light guide plate using only the mat transparent diffusing plate as disclosed in U.S. Pat. No. 4,729,067.

Furthermore, as a measure to achieve higher luminance of a back light used for a liquid crystal display, there has recently been a tendency to employ such construction that two lenticular lens sheets are overlapped with each other at right angles (Monthly Display, May 1996, pp. 35–pp. 39). This type of surface light source is shown in FIG. 15. A light source 21 comprising a cold-cathode tube 21a and a reflector 21b is arranged on one of side end surfaces of a light guide plate 20 composed of a transparent flat plate having a ridge shape in cross section. Light is incident on the light guide plate 20 from the light source 21. The light is propagated throughout the whole area of the light guide plate 20 utilizing total reflection inside the transparent flat plate, a part of the propagated light is taken as diffused reflected light at less than a critical angle by a light scattering reflective plate 22 on the reverse surface of the light guide plate 20, and the diffused light is emitted from a diffusing plate 23 provided on a front surface of the light guide plate 20. Lenticular lens sheets 24 and 25 each having a projection of a triangular prism-type lenticular lens on its one surface, the other surface of which is smooth, are overlapped with each other at right angles, and its diffused emitted light is uniformly and isotropically diffused in a desired angular range utilizing a light focusing function of the lens.

In a surface light source for a back light in a conventional liquid crystal display, there is not only a problem that visual characteristics are relatively narrow but also a problem with high cost of parts because two lenticular lens sheets are used, and huge fabrication costs because the two lenticular lens sheets must be mounted and aligned at right angles, so that the cost of the surface light source for a back light itself is significantly increased. Research and development of a surface light source for a back light in which the necessity of lenticular lens sheets, light diffusion dot pattern printing on the reverse surface of a diffusing plate or a light guide plate, and the like is eliminated has been reported (The Institute of Electronics, Information and Communication Engineers, Technical Report, EID98-79, pp. 67–pp. 72).

SUMMARY OF THE INVENTION

The present invention has been made to solve the above-mentioned problems and has for its object to provide a surface light source for a back light whose cost of parts and fabrication costs are reduced by setting the number of lenticular lens sheets used to one or further eliminating the necessity of the lenticular lens sheets, and a light guide plate provided for the surface light source.

Another object of the present invention is to provide a surface light source for a back light whose cost of parts and fabrication costs are reduced by optimizing the construction on the reverse surface of a light guide plate to set the number of lenticular lens sheets used to one or eliminate the necessity of the lenticular lens sheets, and to eliminate the necessity of light diffusion dot pattern printing on the reverse surface of the light guide plate, and a light guide plate provided for the surface light source.

In order to attain the above-mentioned objects, in a light guide plate for emitting light, which is emitted from a light source provided adjacent to at least one of its side end surfaces, from a light emission surface, a light guide plate according to the present invention is characterized by comprising a first lens portion comprising a plurality of recessed or projected lenticular unit lenses formed of the same resin as that of the light guide plate on the light emission surface, the plurality of lenticular unit lenses in the first lens portion being triangular prism portions whose respective vertexes have an angle of 125° to 165° and being so arranged that their respective ridge lines are nearly parallel to each other.

In the above-mentioned light guide plate according to the present invention, it is preferable that the respective vertexes of the plurality of lenticular unit lenses in the first lens portion have an angle of 135° to 165°.

Furthermore, in the light guide plate according to the present invention, it is more preferable that the respective vertexes of the plurality of lenticular unit lenses in the first lens portion have an angle of approximately 150°.

A light guide plate according to the present invention preferably comprises a second lens portion comprising a plurality of recessed or projected lenticular unit lenses formed of the same resin as that of the light guide plate on a light reflective surface opposite to the light emission surface, the plurality of lenticular unit lenses in the second lens portion being triangular prism portions whose respective vertexes have an angle of 125° to 165° and being so arranged that their respective ridge lines are nearly parallel to each other.

In the above-mentioned light guide plate according to the present invention, it is preferable that the respective vertexes of the plurality of lenticular unit lenses in the second lens portion have an angle of 135 to 165°.

Furthermore, in the light guide plate according to the present invention, it is more preferable that the respective vertexes of the plurality of lenticular unit lenses in the second lens portion have an angle of approximately 150°.

In the above-mentioned light guide plate according to the present invention, it is preferable that the direction of the ridge lines of the plurality of lenticular unit lenses in the first lens portion and the direction of the ridge lines of the plurality of lenticular unit lenses in the second lens portion are nearly perpendicular to each other.

In order to attain the above-mentioned object, a light guide plate according to the present invention is characterized in that one of its side end surfaces is a light incidence surface, and its one surface crossing the light incidence surface is a light emission surface, and a plurality of grooves having approximately equal groove widths are so formed on a surface opposite to the light emission surface that they are nearly parallel to each other and spacing between the grooves is narrowed as the groove moves farther away from the light incidence surface.

Furthermore, the above-mentioned light guide plate according to the present invention is characterized in that the spacing from a far end of one of the plurality of grooves which is close to the light incidence surface to a near end of a groove adjacent thereto in the direction away from the light incidence surface is 5 to 15 times the groove width.

The above-mentioned light guide plate according to the present invention is characterized in that the cross-sectional shape of the plurality of grooves is a shape described in any one of the following items (a), (b) and (c):

a) an N-sided polygon (where N is a natural number of not less than three), b) an isosceles triangle, and c) a part of an ellipse (where the ellipse includes a circle).

Furthermore, a surface light source according to the present invention is characterized by comprising the above-mentioned light guide plate, and a light source provided adjacent to at least one of the side end surfaces of the light guide plate.

The foregoing and other objects, features, aspects and advantages of the present invention will become more apparent from the following detailed description of the present invention when taken in conjunction with the accompanying drawings.

PREFERRED EMBODIMENTS OF THE PRESENT INVENTION

A first embodiment of the present invention will be described in detail with reference to the drawings.

Figure 1A:
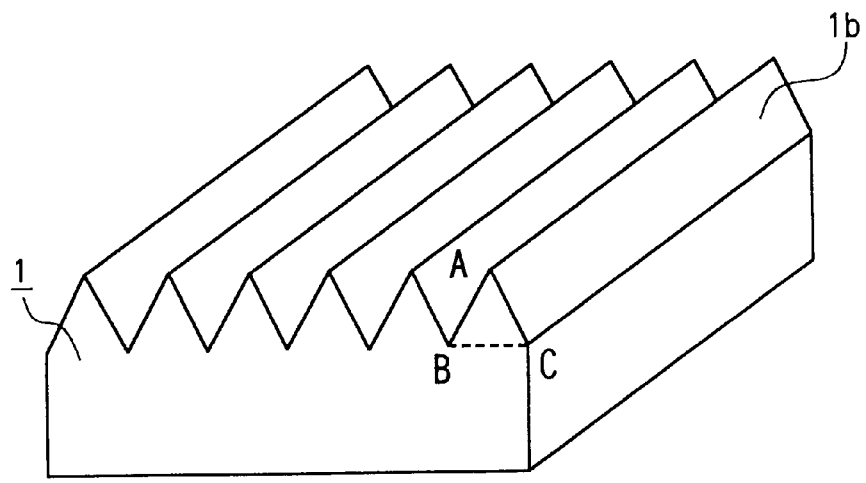
FIGS. 1A and 1B are perspective views showing a light guide plate applied to a first embodiment of the present invention.
Figure 1B:
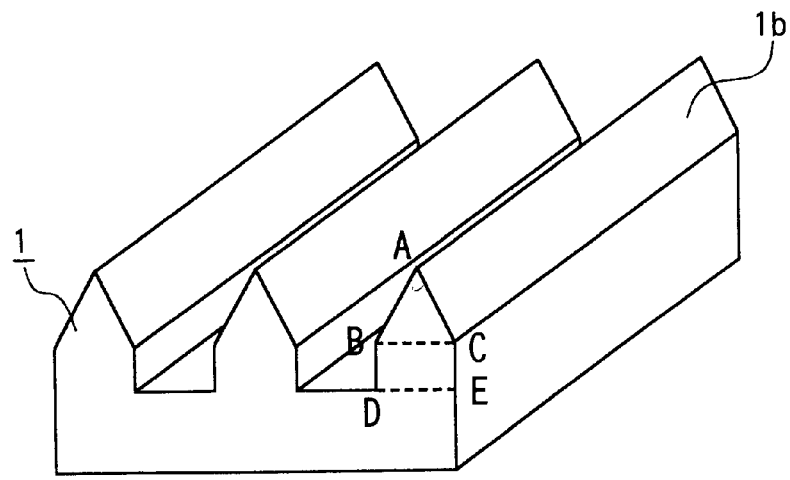

FIGS. 1A and 1B are perspective views showing a light guide plate applied to a first embodiment. The following terms will be defined using the drawings.

A lenticular unit lens means a triangular prism with a triangle formed by vertexes A, B and C taken as its base in FIG. 1A, and a pentagonal prism with a pentagon formed by vertexes A, B, D, E and C taken as its base in FIG. 1B. The lenticular unit lenses 1b illustrated herein are mere examples, and are not limitations. Although in FIGS. 1A and 1B, the lenticular unit lens is one in a projected shape, it may be one in a recessed shape, which is not illustrated.

A triangular prism portion of the lenticular unit lens means a triangular prism with a triangle formed by vertexes A, B and C taken as its base in both FIGS. 1A and 1B.

The vertex of the triangular prism portion means a vertex A in both FIGS. 1A and 1B.

An angle at the vertex A of the triangular prism portion means an angle formed by the side connecting the vertexes A and B and the side connecting the vertexes A and C in both FIGS. 1A and 1B.

Figure 2A:
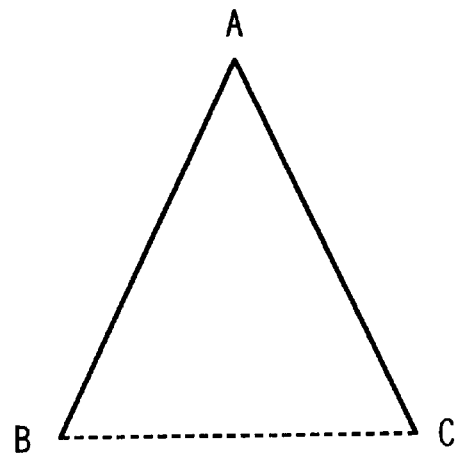
FIGS. 2A, 2B and 2C are schematic views showing a cross-sectional shape of a triangular prism portion.
Figure 2B:
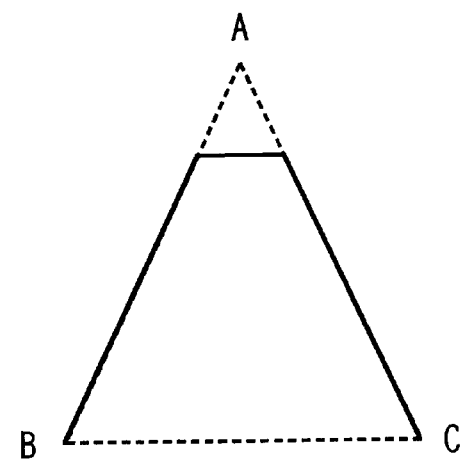
Figure 2C:
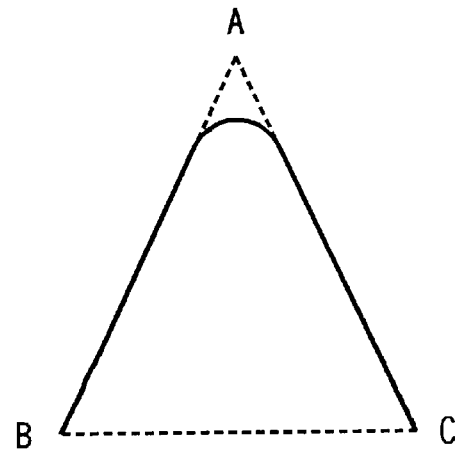

FIGS. 2A, 2B and 2C are schematic views showing cross-sectional shapes of the triangular prism portion.

The triangular prism portion is preferably in the shape of an isosceles triangle formed by vertexes A, B and C, as shown in FIG. 2A. Even if it is changed into the shape of a tetragon as shown in FIG. 2B because the vertex A is slightly chipped, or it is changed into a shape as shown in FIG. 2C because the vertex A is smoothly curved, for example, the performance of a light guide plate is hardly affected, so that all prisms in the shapes are included in the triangular prism portion in the present invention.

Figure 3:
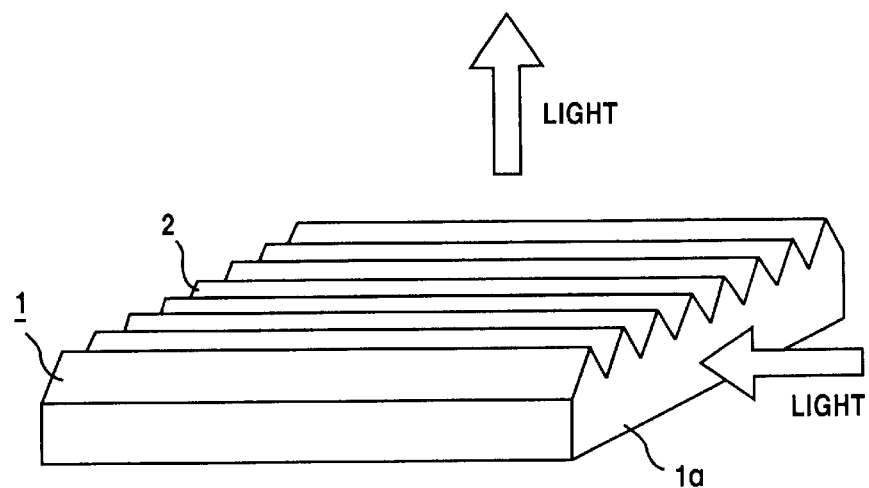
FIG. 3 is a perspective view showing a light guide plate according to a first embodiment of the present invention.

FIG. 3 is a perspective view showing a light guide plate according to the first embodiment of the present invention.

A light guide plate 1 is provided with a transparent lens portion 2 comprising a plurality of lenticular unit lenses formed of the same resin as that of the light guide plate 1. Light reflection processing for irregularly reflecting light and uniformly diffusing the light (scattered point-shaped processing such as fine irregularities and screen process printing, for example) is performed on a surface opposite to the transparent lens portion 2, and a reflective plate is mounted thereon in the subsequent steps (not shown) for the purpose of preventing light leakage.

Figure 6:
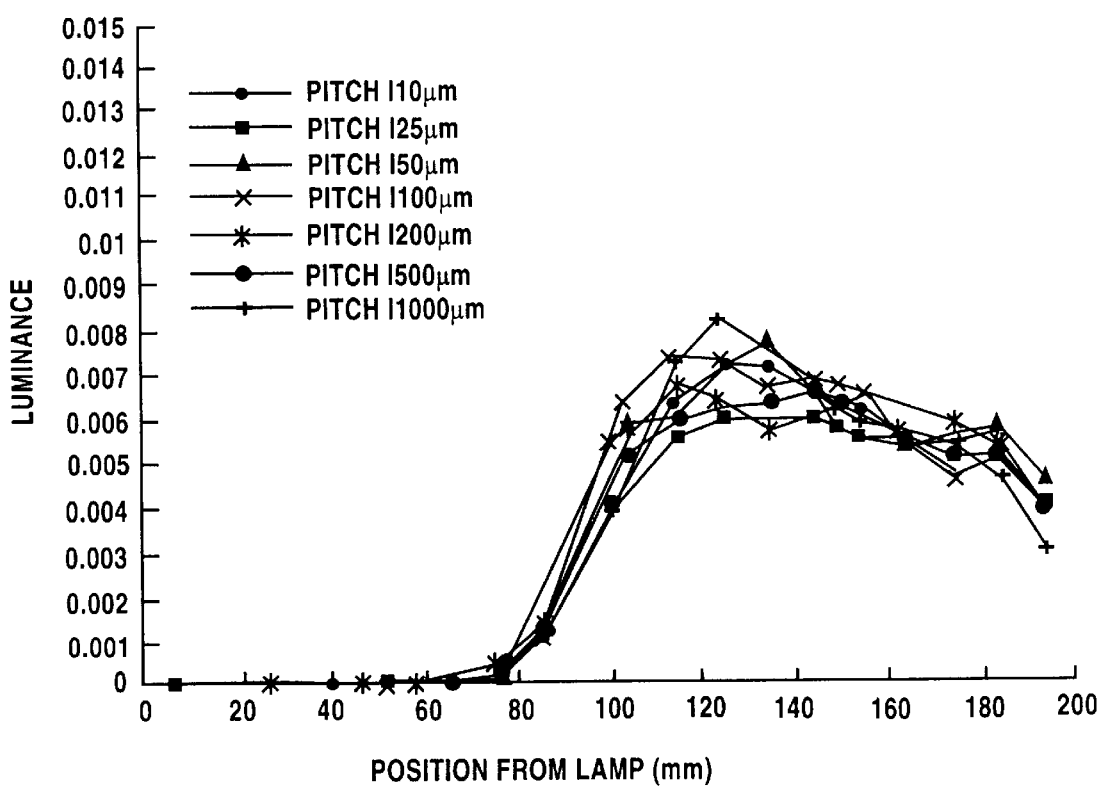
FIG. 6 is a graph showing the change in luminance distribution characteristics with a prism pitch.

The lenticular unit lenses in the transparent lens portion 2 are triangular prisms, and are so arranged that their respective ridge lines are nearly parallel to each other. Particularly, the vertical angle of the triangular prism is set in the range of 125° to 165° on the basis of the results of calculation as described later. If the vertical angle of the triangular prism is in the range of 125° to 165°, the performance of the light guide plate 1 is not affected even if there occur deviations and variations in the size, the pitch, the height and the vertical angle of the triangular prism. Particularly, it is found that luminance distribution characteristics are not greatly changed even if the prism pitch is changed in the range of 10 µm to 1000 µm, as shown in FIG. 6.

The material of the light guide plate 1 is selected from transparent materials. Generally, acrylic resin or polycarbonate resin is used. The thickness of the light guide plate is generally approximately 1 to 10 mm.

Examples of the other transparent materials include acrylic ester such as polymethyl methacrylate and polyacrylic acid methyl, methacrylate ester alone or its copolymers, polyester such as polyethylene terephthalate and polybutylene terephthalate, thermoplastic resin such as polycarbonate, polystyrene, and polymethylpentene, acrylate such as multifunctional urethane acrylate and polyester acrylate cross-linked by ultraviolet rays or electron beams, transparent resin such as unsaturated polyester, transparent glass, and transparent ceramics.

The function of the light guide plate according to the first embodiment of the present invention will be described using FIG. 3.

Light (sideward from the right in FIG. 3) emitted from a light source (not shown) provided adjacent to a side end surface 1a of the light guide plate 1 enters the light guide plate 1 from the side end surface 1a, and is reflected by a surface opposite to the transparent lens portion 2 and a side end surface other than the side end surface 1a. The light introduced toward the transparent lens portion 2 has the function of focusing light, and is emitted from the transparent lens portion 2 for uniformly and isotropically diffusing its diffused emitted light in a desired angular range (upward in FIG. 3).

Figure 4:
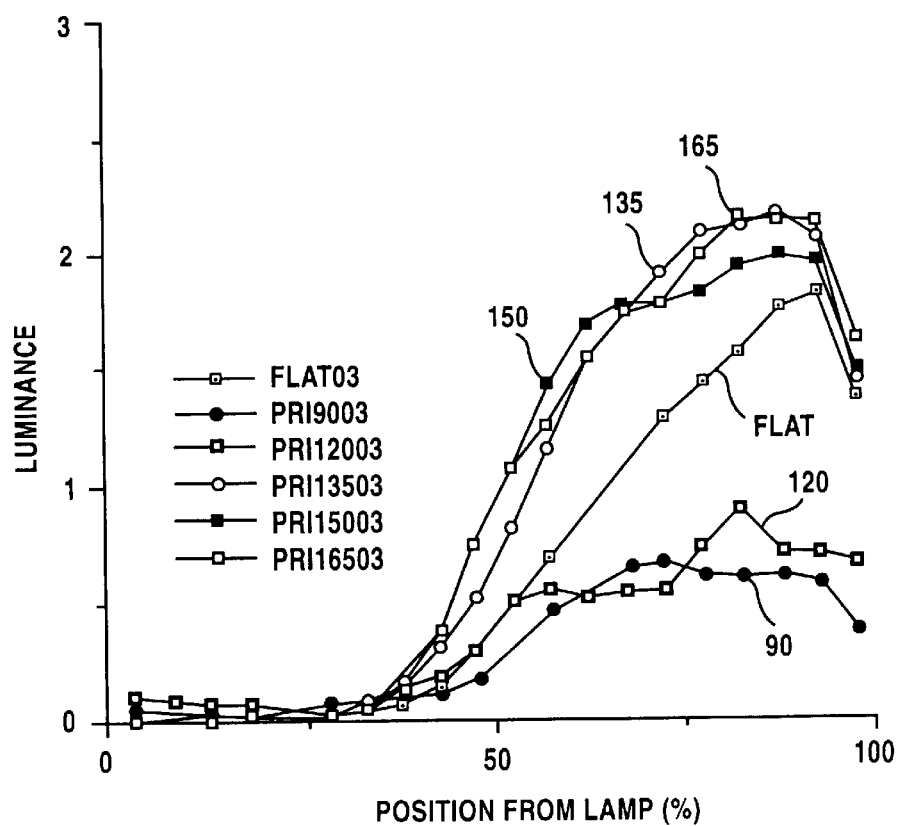
FIG. 4 is a graph showing luminance distribution characteristics.

FIG. 4 is a graph showing luminance distribution characteristics.

The horizontal axis represents the position of the light guide plate from a lamp as a percentage with the length of the light guide plate taken as 100%. A position at a value 0 is a position at an end surface, which is closest to the lamp, of the light guide plate. On the other hand, a position at a value 100 is a position at an end surface, which is farthest from the lamp, of the light guide plate.

The vertical axis represents luminance whose unit is not shown, and means that the larger the value is, the brighter it is.

The graph representing the luminance distribution characteristics shown in FIG. 4 is an analysis of the luminance distribution characteristics of the light guide plate conducted using "CODE-V" which is software for optical design and evaluation developed by Optical Research Associates(ORA) Corporation in the United States, and shows the results of simulation of the luminance distribution characteristics in a case where the wavelength of light irradiated from the lamp is 600 nm, typical PMMA (polymethyl methacrylate) having an index of refraction of 1.49 is used as the material of the light guide plate, and the vertical angle of the triangular prism is changed to 90°, 120°, 125°, 150°, 165° and flat (i.e., no triangular prism) as parameters for evaluation.

As can be made clear from FIG. 4, the luminance distribution characteristics in which the vertical angle is 90° to 120°, which are vertical angles of the lens sheet used together with the conventional light guide plate, are inferior, as compared with the luminance distribution characteristics in which it is flat. Moreover, the luminance distribution characteristics in which the vertical angle is 125° to 165° are substantially improved, as compared with the luminance distribution characteristics in which it is 90° to 120°. Further, the luminance distribution characteristics in which the vertical angle is 135° to 165° are significantly improved. Particularly in the luminance distribution characteristics in which the vertical angle is in the vicinity of 150°, it can be easily understood that a peak effect appears.

Even if the wavelength of light and the index of refraction of the material of the light guide plate are slightly changed, the luminance distribution characteristics made clear herein are not greatly affected. The applicant of the present application has found that the luminance distribution characteristics are substantially improved when the vertical angle is in the range of 125° to 165° as a result of originally simulating the basic optical design of the light guide plate upon being free from the fixed idea that the vertical angle is in the range of 90° to 120° which are vertical angles of the conventional lens sheet, and has proposed an entirely new light guide plate on the basis of the results.

Figure 5:
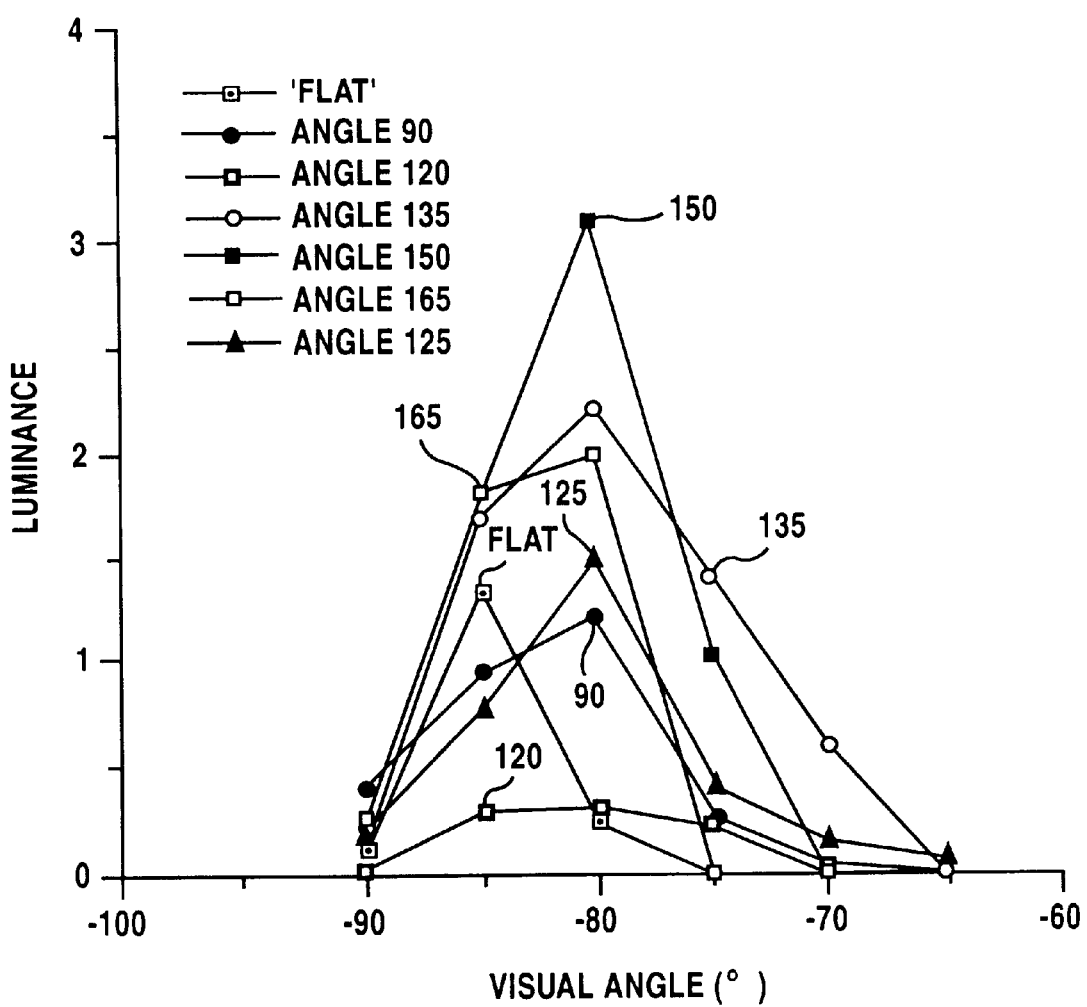
FIG. 5 is a graph showing visual angle characteristics.

FIG. 5 is a graph showing visual angle characteristics.

The horizontal axis represents a visual angle corresponding to the light guide plate, where a value "0" (not shown) means a direction perpendicular to the light guide plate, and a value "−90" means a direction level with the light guide plate. The vertical axis represents luminance whose unit is not shown, and means that the larger the value is, the brighter it is.

The graph representing the visual angle characteristics shown in FIG. 5 is an analysis of the visual angle characteristics of the light guide plate conducted using "CODE-V" in the same manner as described above, and shows the results of simulation of the visual angle characteristics in a case where the wavelength of light irradiated from the lamp is 600 nm, typical PMMA having an index of refraction of 1.49 is used as the material of the light guide plate, and the vertical angle of the triangular prism is changed to 90°, 120°, 125°, 135°, 150°, 165° and flat (i.e., no triangular prism) as parameters for evaluation.

As can be seen from FIG. 5, when the respective visual angle characteristics in which the vertical angle is 90° and 120°, which are visual angles of the lens sheet used together with the conventional light guide plate are compared with each other, the results in the visual angle characteristics in which the vertical angle is 120° is much inferior to those in the visual angle characteristics in which it is 90°. On the other hand, the visual angle characteristics in which it is 125° to 165° are much improved, as compared with the visual angle characteristics in which it is 90°, so that it can be easily understood that a peak effect appears.

Figure 7:
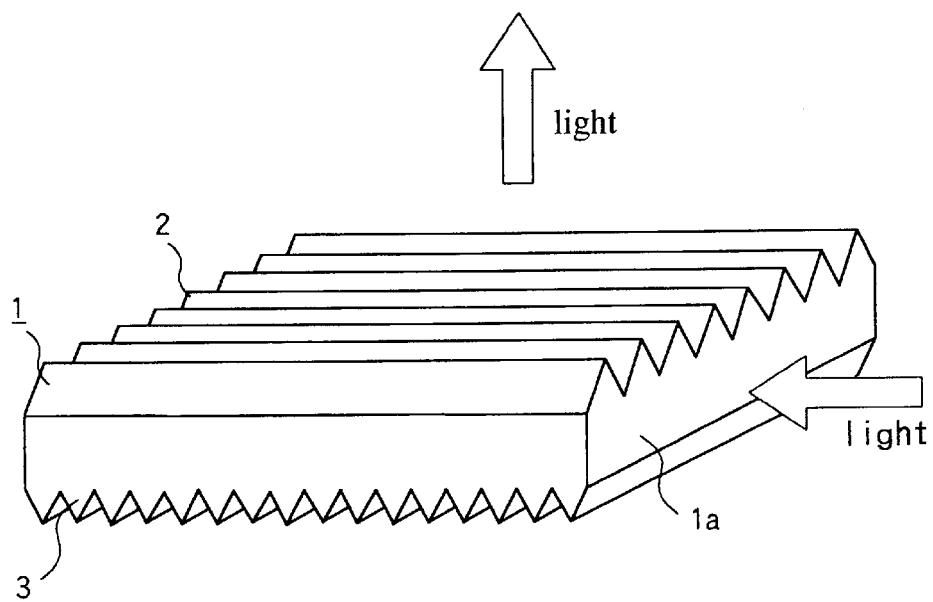
FIG. 7 is a perspective view showing a light guide plate according to a second embodiment of the present invention.

FIG. 7 is a perspective view showing a light guide plate according to a second embodiment of the present invention.

A light guide plate 1 is provided with a transparent lens portion 2 and a reflecting lens portion 3 each comprising a plurality of lenticular unit lenses formed of the same resin as that of the light guide plate 1.

The lenticular unit lenses in each of the transparent lens portion 2 and the reflecting lens portion 3 are triangular prisms, and are so arranged that their respective ridge lines are nearly parallel to each other. The direction of the ridge lines of the plurality of lenticular unit lenses in the transparent lens portion 2 and the direction of the ridge lines of the plurality of lenticular unit lenses in the reflecting lens portion 3 are nearly perpendicular to each other.

Furthermore, the lower surface of the reflecting lens portion 3 is subjected to reflective surface processing by aluminum deposition or the like (not shown) so that it does not transmit light.

The function of the light guide plate according to the second embodiment of the present invention will be described using FIG. 7.

Light (sideward from the right in FIG. 7) emitted from a light source (not shown) provided adjacent to a side end surface 1a of the light guide plate 1 enters the light guide plate 1 from the side end surface 1a, and is reflected by the lower surface of the reflecting lens portion 3 and a side end surface other than the side end surface 1a. At this time, the reflecting lens portion 3 has the function of equalizing light introduced into the transparent lens portion 2 in the light guide plate 1, and introduces diffused light toward the transparent lens portion 2.

The light introduced toward the transparent lens portion 2 by the reflecting lens portion 3 has the function of focusing light, and is emitted from the transparent lens portion 2 for uniformly and isotropically diffusing its diffused emitted light in a desired angular range (upward in FIG. 7).

Furthermore, a method of fabricating a light guide plate according to the present invention includes the step of forming the light guide plate using a metal mold obtained by processing a fine pattern of the transparent lens portion 2 and metal molds obtained by processing fine patterns of the transparent lens portion 2 and the reflecting lens portion 3, to form a plurality of lenticular unit lenses formed of the same resin as that of the light guide plate simultaneously with the formation of the light guide plate.

Furthermore, the applicant of the present application has filed a light guide plate for a surface light source or a method of fabricating a light guide plate by U.S. patent application Ser. No. 08/742,500 as one means for reducing the fabrication cost of the light guide plate.

In the above-mentioned U.S. patent application, one surface of a flat plate is taken as a light emission surface, a fine pattern for bringing about a lens function is formed on only the surface, and only a metal mold portion subjected to the fine pattern is made replaceable.

In the above-mentioned U.S. patent application, in order to subject the lower surface of the reflecting lens portion 3 to opaque processing, a thermal transfer foil is inserted into a metal mold portion forming the fine pattern of the reflecting lens portion 3, to transfer an opaque material thin film staked on the thermal transfer foil by melting heat and molding pressure at the time of injection of resin simultaneously with the formation of the light guide plate.

Consequently, the application of the present invention to the above-mentioned invention eliminates the necessity of two lens film sheets which have been conventionally required. Therefore, it is possible to subject the lower surface of the reflecting lens portion 3 to opaque processing simultaneously with the formation of the light guide plate, so that it can be expected to bring about a new effect of significantly reducing the fabrication cost of the light guide plate.

As described in the foregoing, in the light guide plate according to the present invention, the lenticular lens is formed simultaneously with the formation of the light guide plate, whereby the number of lenticular lens sheets used which have been conventionally required can be reduced, or the necessity of the lenticular lens sheets is further eliminated. As a result, it is possible to significantly reduce the fabrication cost of the light guide plate.

A surface light source according to the present invention uses the above-mentioned light guide plate, so that the cost of parts of the surface light source is significantly reduced.

Figure 8A:
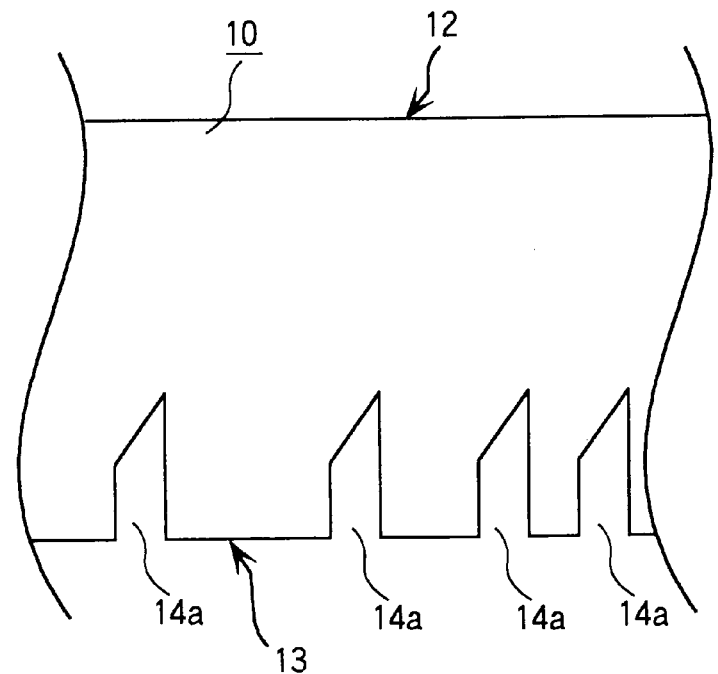
FIG. 8A is a partially sectional view of a light guide plate according to a third embodiment of the present invention.
Figure 8B:
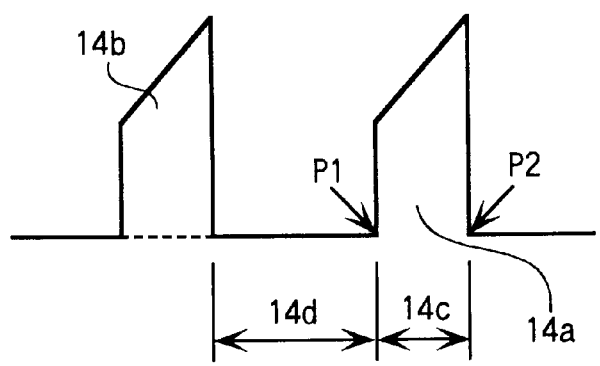
FIGS. 8B and 8C are enlarged sectional views showing a principal part of the light guide plate.

FIGS. 8A and 8B illustrate a light guide plate according to a third embodiment of the present invention, where FIG. 8A is a partially sectional view of the light guide plate, and FIG. 8B is an enlarged sectional view showing a principal part of the light guide plate. The following terms will be defined using the drawings.

Grooves mean a plurality of grooves 14a (see FIG. 8A) cut out to approximately the same length as the length of a light source on a surface 13 opposite to a light emission surface 12 of a light guide plate 10.

Figure 8C:
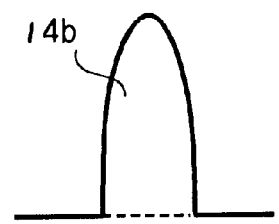

The cross-sectional shape of the groove 14a means a cross-sectional shape 14b corresponding to the groove 14a (see FIGS. 8B and 8C), and is the half of a quadrilateral or an ellipse in this case. In FIG. 8B, the cross-sectional shape 14b of the groove 14a may be an N-sided polygon (where N is a natural number of not less than 3). Particularly when N is 3, the cross-sectional shape 14b of the groove 14a is a V shape. The point of intersection of the sides of the N-sided polygon which is the cross-sectional shape 14b may be in a shape smoothly rounded off.

A near end of a groove is a point P1 of the groove 14a in a case where there is a light incidence surface (not shown) on the left side in FIG. 8B.

A far end of a groove is a point P2 of the groove 14a in a case where there is a light incidence surface (not shown) on the left side in FIG. 8B.

The width of a groove is a groove width 14c (see FIG. 8B).

The spacing from a far end of a groove to a near end of a groove adjacent thereto (hereinafter merely referred to as "groove spacing") is groove spacing 14d (see FIG. 8B).

The third embodiment of the present invention will be described in detail with reference to the drawings.

Figure 9:
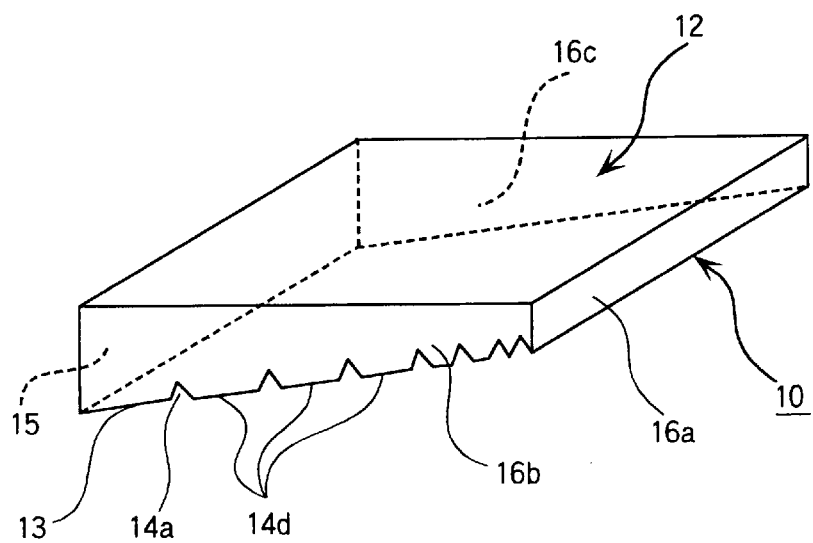
FIG. 9 is a perspective view showing the light guide plate according to the third embodiment of the present invention.
Figure 10:
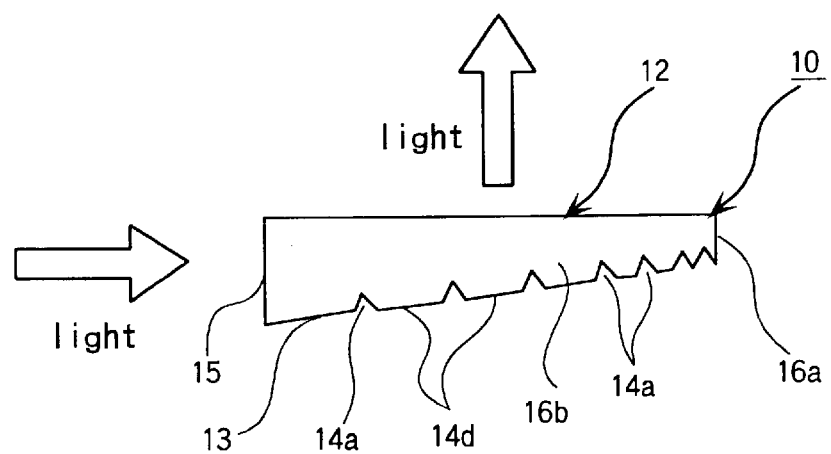
FIG. 10 is a front view of the light guide plate according to the third embodiment of the present invention.

FIG. 9 is a perspective view of the light guide plate according to the third embodiment of the present invention, and FIG. 10 is a front view of the light guide plate.

The light guide plate 10 is formed by resin molding using a metal mold and at the same time, the plurality of grooves 14a (in a triangular shape in cross section in this case) are formed on the light reflective surface 13.

On a light incidence surface 15, light irradiated from a light source (not shown) closely provided almost parallel thereto is incident, as described below.

As described in the foregoing, the plurality of grooves 14a are formed nearly parallel to the light incidence surface 15 on the light reflective surface 13. Further, the groove spacing 14d between the grooves 14a is gradually narrowed as the groove 14a moves farther away from the light incidence surface 15. Further, an aluminum reflective film is formed on the light reflective surface 13 by sputtering and deposition (not shown) in order to prevent light from leaking to increase reflection efficiency after resin molding.

Light incident from the light incidence surface 15 is reflected by the light reflective surface 13 and three side surfaces 16a, 16b and 16c of the light guide plate 10, and almost all the incident light is finally emitted as light having uniform directionality from the light emission surface 12. A leakage preventing member such as a white tape is mounted on the side surfaces 16a, 16b and 16c in order to prevent the leakage of light.

The material of the light guide plate 10 is selected from transparent materials, as in the above-mentioned first and second embodiments. Generally, acrylic resin or polycarbonate resin is used. The shape of the light guide plate is the shape of a parallel flat plate or a flat plate having a wedge shape in cross section. The thickness thereof is generally approximately 1 to 10 mm.

Examples of the other transparent materials include acrylic ester such as polymethyl methacrylate and polyacrylic acid methyl, methacrylate ester alone or its copolymers, polyester such as polyethylene terephthalate and polybutylene terephthalate, thermoplastic resin such as polycarbonate, polystyrene, and polymethylpentene, acrylate such as multifunctional urethane acrylate and polyester acrylate cross-linked by ultraviolet rays or electron beams, transparent resin such as unsaturated polyester, transparent glass, and transparent ceramics.

The function of the light guide plate according to the third embodiment of the present invention will be described using FIG. 10.

Light (sideward from the left in FIG. 10) emitted from a light source (not shown) provided adjacent to the light incidence surface 15 of the light guide plate 10 enters the light guide plate 10 from the light incidence surface 15, is reflected by the light reflective surface 13, the plurality of grooves 14a and the side surfaces 16a, 16b and 16c, and is emitted from the light emission surface 12 (upward in FIG. 10).

Figure 11:
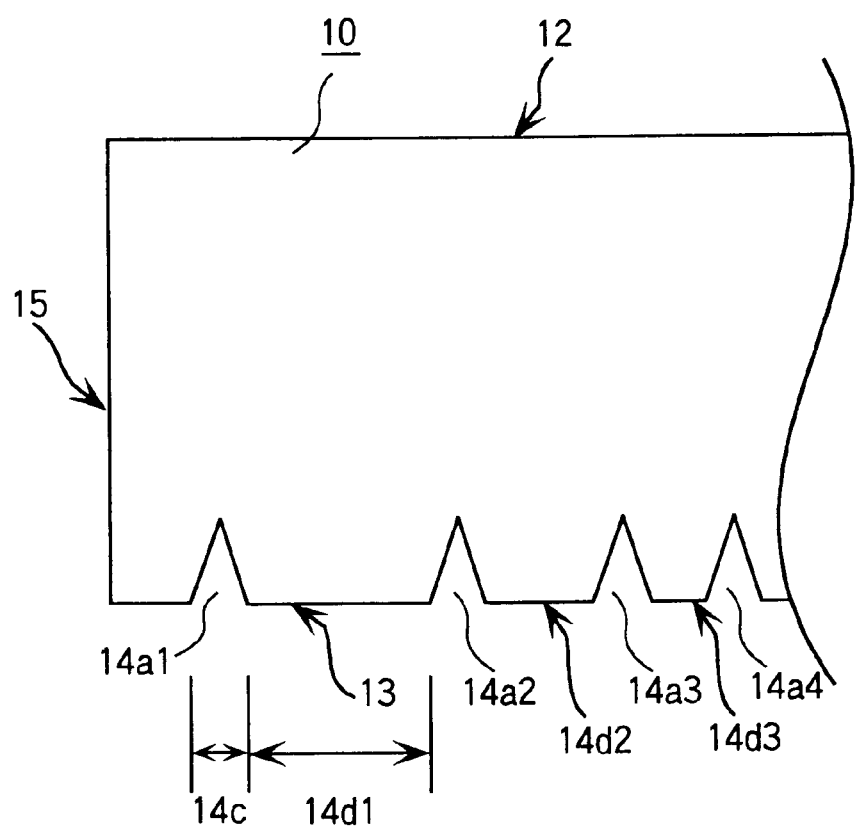
FIG. 11 is a partially sectional view of the light guide plate according to the third embodiment of the present invention.

FIG. 11 is a partially sectional view of the light guide plate according to the third embodiment of the present invention.

A plurality of grooves having a triangular shape in cross section (the shape of an isosceles triangle in this case) nearly parallel to the light incidence surface 15 and having approximately equal groove widths 14c are formed on the light reflective surface 13, and the groove spacing is gradually narrowed, for example, groove spacing 14d1, groove spacing 14d2, groove spacing 14d3 . . . as the groove moves farther away from the light incidence surface 15, for example, a groove 14a1, a groove 14a2, a groove 14a3, a groove 14a4, . . . .

Figure 12:
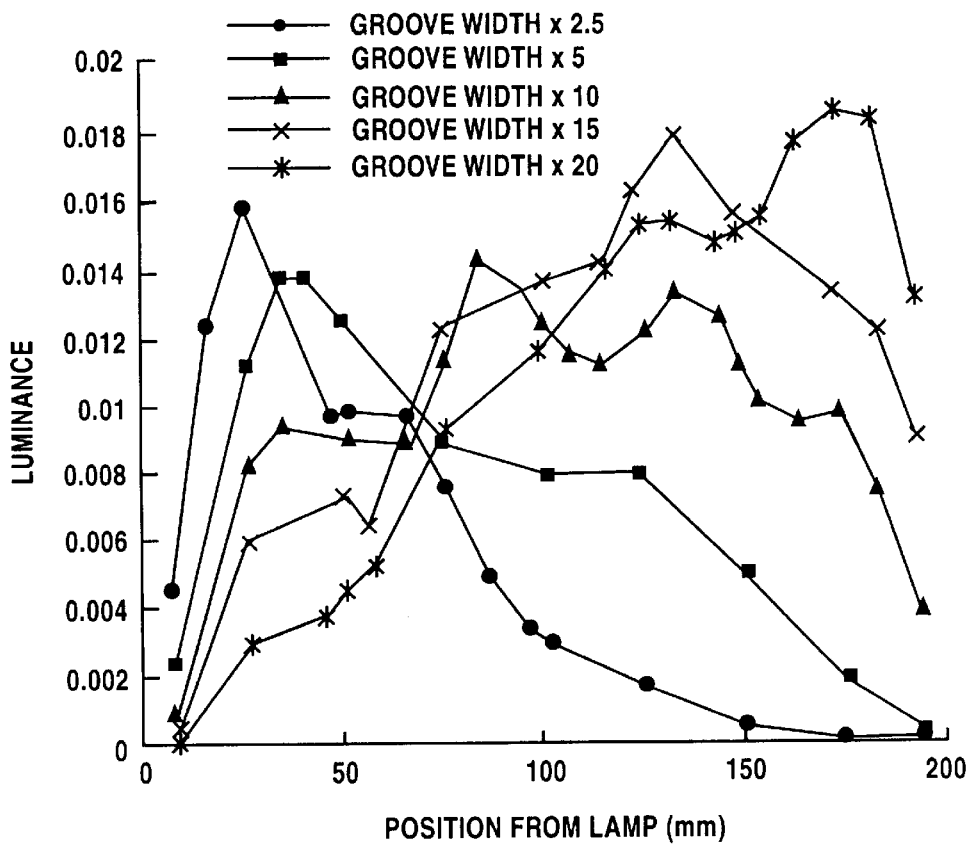
FIG. 12 is a graph showing luminance distribution characteristics.

FIG. 12 is a graph showing luminance distribution characteristics.

The horizontal axis represents the distance of the light guide plate from the light source (a lamp), where a position at a value "0" is the position of an end surface of the lamp.

The vertical axis represents luminance whose unit is not shown, and means that the larger the value is, the brighter it is.

The graph represents the transition of the luminance distribution characteristics in a case where the groove width 14c is fixed, to change the groove spacing 14d1 closest to the light incidence surface 15 in the light guide plate according to the present invention in which the groove spacing is gradually narrowed as the groove moves farther away from the light incidence surface 15 as shown in FIG. 11, and is an analysis of the luminance distribution characteristics of the light guide plate conducted using "CODE-V" which is software for optical design and evaluation developed by ORA Corporation in the United States.

Figure 13:
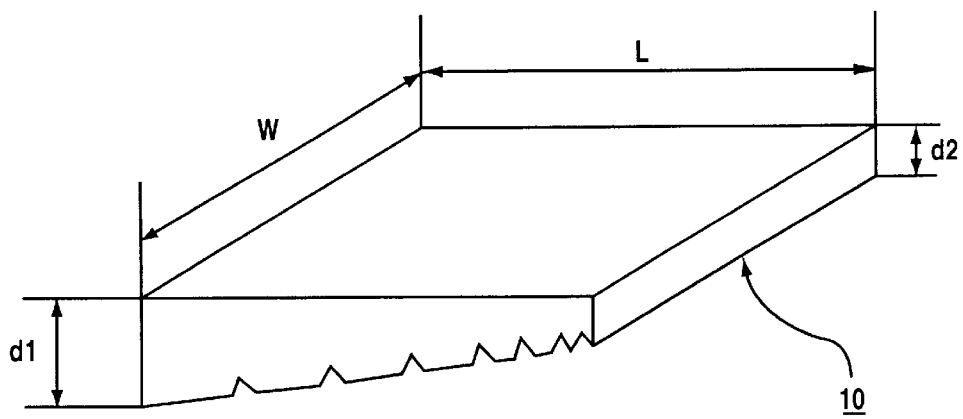
FIG. 13 is a perspective view showing the light guide plate according to the third embodiment of the present invention.

As parameters for evaluation, 1) the shape of the light guide plate is the shape of a flat plate, which is in a wedge shape in cross section, having a length L of 190 (mm), having a width W of 260 (mm), having a thickness d1 of 3 (mm), and having a thickness d2 of 1.2 (mm) (see FIG. 13).

2) the wavelength of light irradiated from the light source (the lamp) is 600 nm, 3) the material of the light guide plate is PMMA having an index of refraction of 1.49, 4) The groove 14a on the light reflective surface 13 has the shape of an isosceles triangle in cross section whose base, which is a groove width 14c, has a length of 0.2 (mm) and whose vertical angle is 150°, 5) the light reflective surface 13 and the groove 14a form an aluminum reflective film, and 6) the groove spacing 14d1 is changed in five stages from 2.5 times to 20 times the groove width 14c, that is, five points in the range of 0.5 (mm) to 4 (mm), to simulate the luminance distribution characteristics.

As can be made clear from FIG. 12, when the groove spacing 14d1 is 2.5 times and 20 times the groove width 14c, the luminance distribution characteristics are offset in a position near the light source and a position far therefrom, so that the luminance distribution characteristics are extremely bad. On the other hand, when the groove spacing 14d1 is 5 times, 10 times and 15 times the groove width 14c, the luminance distribution characteristics are so improved as to be distributed much more uniformly, as compared with that in a case where the groove spacing 14d1 is 2.5 times and 20 times the groove width 14c, so that it can be easily understood that a peak effect appears. Even if the wavelength of light and the index of refraction of the material of the light guide plate are slightly changed, the luminance distribution characteristics made clear herein are not greatly affected.

The inventors of the present application have found that the luminance distribution characteristics are significantly improved when the ratio of the lengths of the groove width 14c and the groove spacing 14d1 is in the range of 1:5 to 1:15 as a result of originally simulating the basic optical design of the light guide plate in view of the length relationship between the groove width 14c and the groove spacing 14d1, and have proposed an entirely new light guide plate on the basis of the results.

A method of fabricating the light guide plate according to the present invention includes the step of forming the light guide plate using a metal mold obtained by processing a fine pattern of the light reflective surface.

As described in the foregoing, according to the light guide plate in the present invention and the method of fabricating the light guide plate, the groove spacing is narrowed as the grooves are arranged farther away from the light incidence surface. Particularly, the construction on the reverse surface of the light guide plate is so optimized that the spacing from a far end of the one groove closest to the light incidence surface to a near end of the groove adjacent thereto is 5 times to 15 times the groove width. Therefore, the number of lenticular lens sheets used is one, or the necessity of the lenticular lens sheets is eliminated. Furthermore, the necessity of light diffusion dot pattern printing on the reverse surface of the light guide plate is eliminated. Therefore, it is possible to significantly reduce the cost of parts and the fabrication cost of the light guide plate.

According to the surface light source according to the present invention, the above-mentioned light guide plate is used, so that the cost of parts of the surface light source is significantly reduced.

Figure 14:
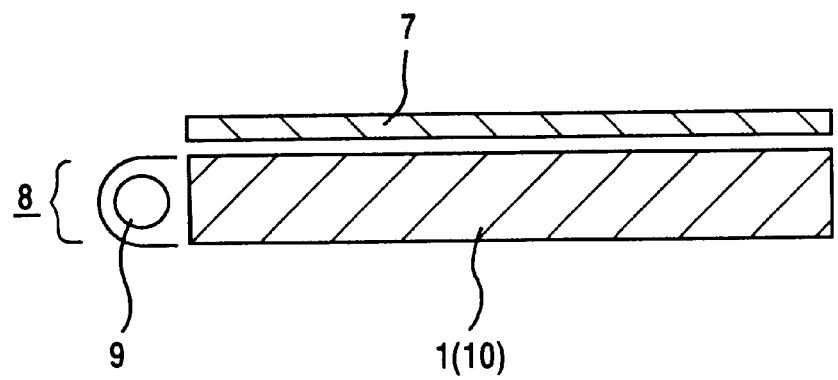
FIG. 14 is a schematic view showing a liquid crystal display comprising a surface light source according to the present invention.
Figure 15:
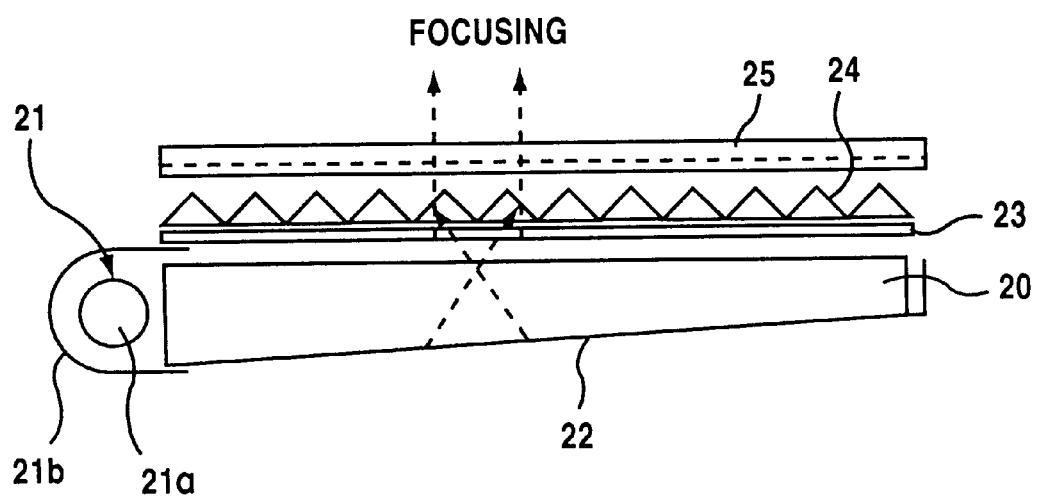
FIG. 15 is a schematic view showing a surface light source for a back light for a conventional liquid crystal display.

FIG. 14 is a schematic view showing a liquid crystal display comprising the above-mentioned surface light source according to the present invention.

The liquid crystal display comprises a liquid crystal panel 7 and a surface light source 8. The surface light source 8 is constituted by the light guide plate 1 (10) according to the present invention, a light source 9 such as a fluorescent tube, various control circuits (not shown), and the like.

Light emitted from the light source 9 enters the light guide plate 1 (10) from its side end surface, is reflected by the lower surface of a reflecting lens portion and a side end surface other than the above-mentioned side end surface, and is repeatedly focused. Diffused emitted light is introduced into the liquid crystal panel 7 upon being uniformly and isotropically diffused in a desired angular range.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light guide plate, formed from a resin for emitting light, from a light source provided adjacent to at least one of its side end surfaces, from a light emission surface, comprising:

a first lens portion comprising a plurality of recessed or projected lenticular unit lenses formed from the same resin as that of the light guide plate on said light emission surface, the plurality of lenticular unit lenses in said first lens portion being triangular prism portions whose respective vertexes have an angle of 125° to 165° and being so arranged that their respective ridge lines are nearly parallel to each other.

2. The light guide plate according to claim 1, wherein the respective vertexes of the plurality of lenticular unit lenses in said first lens portion have an angle of 135° to 165°.

3. The light guide plate according to claim 2, wherein the respective vertexes of the plurality of lenticular unit lenses in said first lens portion have an angle of approximately 150°.

4. The light guide plate according to claim 1, wherein the triangular prism portions are isosceles triangular prism portions.

5. The light guide plate according to claim 1, wherein the thickness of the light guide plate is about 1 to 10 mm.

6. A surface light source comprising:

a light guide plate formed from a resin comprising a first lens portion comprising a plurality of recessed or projected lenticular unit lenses formed of the same resin as that of the light guide plate on a light emission surface, the plurality of lenticular unit lenses in said first lens portion being triangular prism portions whose respective vertexes have an angle of 125° to 165° and being so arranged that their respective ridge lines are nearly parallel to each other; and a light source provided adjacent to at least one of side end surfaces of said light guide plate, said surface light source emitting light from the light emission surface.

7. The surface light source according to claim 6, wherein the triangular prism portions are isosceles triangular prism portions.

8. A light guide plate, formed from a resin for emitting light, from a light source provided adjacent to at least one of its side end surfaces, from a light emission surface, comprising:

a first lens portion comprising a plurality of recessed or projected lenticular unit lenses formed of the same resin as that of said light guide plate on said light emission surface, the plurality of lenticular unit lenses in said first lens portion being triangular prism portions whose respective vertexes have an angle of 125° to 165° and being so arranged that their respective ridge lines are nearly parallel to each other; and a second lens portion comprising a plurality of recessed or projected lenticular unit lenses formed of the same resin as that of said light guide plate on a light reflective surface opposite to said light emission surface, the plurality of lenticular unit lenses in said second lens portion being triangular prism portions whose respective vertexes have an angle of 125° to 165° and being so arranged that their respective ridge lines are nearly parallel to each other.

9. The light guide plate according to claim 8, wherein the respective vertexes of the plurality of lenticular unit lenses in said first lens portion have an angle of 135° to 165°.

10. The light guide plate according to claim 8, wherein the direction of the ridge lines of the plurality of lenticular unit lenses in said first lens portion and the direction of the ridge lines of the plurality of lenticular unit lenses in said second lens portion are nearly perpendicular to each other.

11. The light guide plate according to claim 8, wherein the respective vertexes of the plurality of lenticular unit lenses in said second lens portion have an angle of 135° to 165°.

12. The light guide plate according to claim 8, wherein the respective vertexes of the plurality of lenticular unit lenses in said first lens portion have an angle of approximately 150°.

13. The light guide plate according to claim 8, wherein the respective vertexes of the plurality of lenticular unit lenses in said second lens portion have an angle of approximately 150°.

14. The light guide plate according to claim 8, wherein the triangular prism portions are isosceles triangular prism portions.

15. A surface light source comprising:

a light guide plate formed from a resin comprising a first lens portion comprising a plurality of recessed or projected lenticular unit lenses formed of the same resin as that of said light guide plate on a light emission surface, the plurality of lenticular unit lenses in said first lens portion being triangular prism portions whose respective vertexes have an angle of 125° to 165° and being so arranged that their respective ridge lines are nearly parallel to each other, and a second lens portion comprising a plurality of recessed or projected lenticular unit lenses formed of the same resin as that of said light guide plate on a light reflective surface opposite to said light emission surface, the plurality of lenticular unit lenses in said second lens portion being triangular prism portions whose respective vertexes have an angle of 125° to 165° and being so arranged that their respective ridge lines are nearly parallel to each other; and a light source provided adjacent to at least one of side end surfaces of said light guide plate, said surface light source emitting light from the light emission surface.

16. A light guide plate, wherein one of its side end surfaces is a light incidence surface, and its one surface crossing said light incidence surface is a light emission surface, and a plurality of grooves having approximately equal groove widths are so formed on a surface opposite to said light emission surface that they are nearly parallel to each other, and spacing between the grooves is narrowed as the distance from the light incidence surface increases, the spacing from a far end of one of the plurality of grooves which is proximate to said light incidence surface to a near end of a groove adjacent thereto farther away from said light incidence surface is 5 to 15 times said groove width.

17. The light guide plate according to claim 16, wherein the cross-sectional shape of said plurality of grooves is a shape described in any one of the following items (a), (b) and (c):

a) an N-sided polygon, where N is a natural number of not less than three, b) an isosceles triangle, and c) a part of an ellipse, where the ellipse includes a circle.

18. The light guide plate according to claim 16, wherein the light guide plate has a wedge shape.

19. A surface light source comprising:

a light guide plate formed from a resin, one of its side end surfaces being a light incidence surface, and its one surface crossing said light incidence surface being a light emission surface, and a plurality of grooves having approximately equal groove widths being so formed on a surface opposite to said light emission surface that they are nearly parallel to each other and spacing between the grooves is narrowed as the distance from said light incidence surface increases, the spacing from a far end of one of the plurality of grooves which is proximate to said light incidence surface to a near end of a groove adjacent thereto farther away from said light incidence surface is 5 to 15 times said groove width; and a light source provided adjacent to at least one of the side end surfaces of said light guide plate, said surface light source emitting light from the light emission surface.

20. The surface light source according to claim 19, wherein the light guide plate has a wedge shape.

* * * * *